March 3, 1964    J. CHASS    3,122,927
ACCELEROMETER
Filed June 23, 1961

INVENTOR.
JACOB CHASS
BY
*Donald S. Cohen*
ATTORNEY

United States Patent Office 3,122,927
Patented Mar. 3, 1964

3,122,927
ACCELEROMETER
Jacob Chass, Philadelphia, Pa., assignor to International Resistance Company, Philadelphia, Pa.
Filed June 23, 1961, Ser. No. 126,789
4 Claims. (Cl. 73—517)

The present invention relates to an accelerometer, and more particularly to an electrical accelerometer having no moving parts.

In general, electrical accelerometers heretofore available comprise an electrical component of the type having a variable electrical output, such as a variable resistor or inductor, and mechanical means which is mounted for movement when accelerated and which is secured to the electrical component to vary the electrical output of the component when the mechanical means moves. Such accelerometers are complicated to assemble, and are therefore expensive to manufacture. Also, because of the mechanical movement, these accelerometers are subject to inaccuracies or break down upon wear of the mechanical parts during use.

It is an object of the present invention to provide a novel accelerometer.

It is another object of the present invention to provide a novel electrical accelerometer.

It is still another object of the present invention to provide an electrical accelerometer having no moving parts.

It is a further object of the present invention to provide an accelerometer utilizing a differential transformer mounted on a core of a material the permeability of which varies when the material is stressed.

It is a still further object of the present invention to provide an electrical accelerometer which measures acceleration in only one direction.

It is yet another object of the present invention to provide a novel stress balance accelerometer.

Other objects will appear hereinafter.

For the purpose of illustrating the invention there is shown in the drawings forms which are presently preferred; it being understood, however, that this invention is not limited to the precise arrangements and instrumentalities shown.

Figure 1:
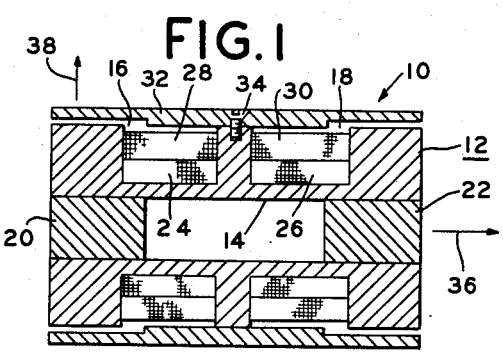
FIGURE 1 is a transverse sectional view of an accelerometer of the present invention.

Referring initially to FIGURE 1, the accelerometer of the present invention is generally designated as 10.

Accelerometer 10 comprises a core 12 which is circular in transverse cross-section. Core 12 is of a magnetic material the permeability of which varies when the material is stressed, such as a permalloy. The core 12 is provided with a central passage 14 extending longitudinally therethrough, and a pair of longitudinally spaced, annular grooves 16 and 18 in its outer surface. The grooves 16 and 18 are of the same dimensions, and are uniformally spaced from the respective ends of the core 12. A pair of identical weights 20 and 22 are fixedly secured in the passage 14 in the core 12 at opposite ends of the core.

A primary winding 24 of an insulated, electrically conductive wire is helically wound around the core 12 within the groove 16. A second primary winding 26 of an insulated, electrically conductive wire is helically wound around the core 12 within the groove 18. The primary windings 24 and 26 are of the same length. A secondary winding 28 of an insulated, electrically conductive wire is helically wound around the core 12 within the groove 16, and a second secondary winding 30 of an insulated, electrically conductive wire is wound around the core 12 within the groove 18. The secondary windings 28 and 30 are of the same length. Although the secondary windings 28 and 30 are shown as being wound around the primary windings 24 and 26 respectively, the primary windings 24 and 26 may be wound around the secondary windings 28 and 30 respectively.

Figure 2:
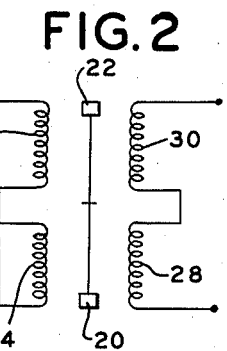
FIGURE 2 is a schematic view of the electrical circuit of the accelerometer of FIGURE 1.

As shown in FIGURE 2, the primary windings 24 and 26 are electrically connected to each other, and the secondary windings 28 and 30 are electrically connected to each other. The connection between the primary windings 24 and 26, and between the secondary windings 28 and 30 are such that when an A.C. current is applied to the primary windings 24 and 26, the voltages induced across the secondary windings 28 and 30 will be of opposite polarity. Thus, when the voltages induced across the secondary windings 28 and 30 are of equal magnitude, the voltages will balance each other so that the electrical output from the secondary windings will be zero. However, if the voltage induced across either of the secondary windings becomes greater than the voltage induced across the other secondary winding, there will be provided an output signal from the secondary windings which is equal to the difference between the voltagese induced across the secondary windings, and of a polarity corresponding to that of the voltage of greater magnitude. As shown in FIGURE 2, the primary windings 24 and 26 are electrically connected in bucking relation, and the secondary windings 28 and 30 are connected in series relation. However, the same result can be achieved by connecting the primary windings 24 and 26 in series relation, and the secondary windings 28 and 30 in bucking relation.

A mounting sleeve 32 of a magnetic material surrounds the core 12. The mounting sleeve 32 is secured to the core 12 only at a point intermediate the annular grooves 16 and 18, such as by the screw 34. The end portions of the mounting sleeve 32 are free from the core 12.

Figure 3:
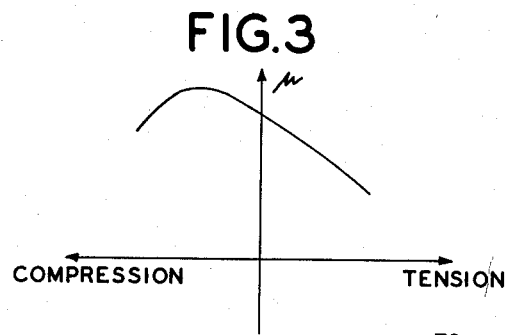
FIGURE 3 is a graph showing the variation in the permeability of the material used in the accelerometer of the present invention when the material is stressed.

In the use of the accelerometer 10, the accelerometer is supported on the movable object by the mounting sleeve 32, and an A.C. current is applied to the primary windings 24 and 26. When the movable object is stationary, the voltages induced across the secondary windings 28 and 30 are of equal magnitude so that they balance each other out, and the output from the accelerometer is zero. When the object is moved so that the accelerometer 10 is accelerated longitudinally, for example in the direction of the arrow 36 in FIGURE 1, the weights 20 and 22 apply forces to the portions of the core 12 under the grooves 16 and 18 respectively so as to stress those portions of the core. Since the weight 20 is behind the portion of the core 12 under the groove 16, that portion of the core is stressed in compression. Since the weight 22 is ahead of the portion of the core 12 under the groove 18, that portion of the core is stressed in tension. As shown in the graph of FIGURE 3, the permeability of the material of the core 12 varies when the material is stressed, and varies differently when stressed in tension than when stressed under compression. When the material of the core 12 is stressed in tension, the permeability of the material decreases, and when stressed under compression, the permeability of the material increases.

Thus, when the accelerometer 10 is accelerated in the direction of the arrow 36 in FIGURE 1, the permeability of the portion of the core 12 within the groove 16, which is placed under compression by the weight 20, increases. This causes the voltage induced across the secondary winding 28 to increase. However, the permeability of the portion of the core 12 within the groove 18, which is stressed in tension by the weight 22, decreases. This causes the voltage induced across the secondary winding 30 to decrease. Thus, the voltages induced across the secondary windings 28 and 30 are different so that an output signal is provided from the accelerometer 10. By pre-calibrating the accelerometer 10 of the present invention, the output signal provided when the accelerometer is accelerated can be read directly as the magnitude of acceleration. Since the polarity of the output signal from the accelerometer 10 depends on which of the secondary windings has an induced voltage of greater magnitude, the polarity of the output signal indicates the direction that the accelerometer 10 is being accelerated.

If the accelerometer 10 of the present invention is accelerated radially, for example in the direction of the arrow 38 in FIGURE 1, there will be no change in the output of the accelerometer 10. When the accelerometer 10 is accelerated radially, both of the weights 20 and 22 are accelerated radially in the same direction so as to stress the portions of the core 12 under the grooves 16 and 18 in the same manner. Thus, the permeability of the portions of the core 12 under both of the grooves 16 and 18 are varied in the same manner so that the voltages induced across both of the secondary windings 28 and 30 are varied in the same manner. Since the voltages induced across the secondary windings 28 and 30 are of opposite polarity, the variation in the voltages induced across the secondary windings will balance each other so that the output from the accelerometer 10 remains constant. Thus, the electrical output from the accelerometer 10 of the present invention is varied only when the accelerometer 10 is accelerated longitudinally, but is unaffected by radial acceleration of the accelerometer. Therefore, the accelerometer 10 of the present invention can be used to accurately measure acceleration in any one direction by mounting the accelerometer 10 so that it is accelerated longitudinally in the desired direction.

Therefore, the accelerometer 10 of the present invention is a small, compact unit which is easy to assemble so as to be inexpensive to manufacture. Also, the accelerometer 10 of the present invention has no moving parts so that it is not subject to inaccuracies due to wear or breakdown during use. Furthermore, the accelerometer of the present invention provides for accurate measurement of acceleration in any one direction, and is unaffected by being accelerated in directions other than the direction being measured.

Figure 4:
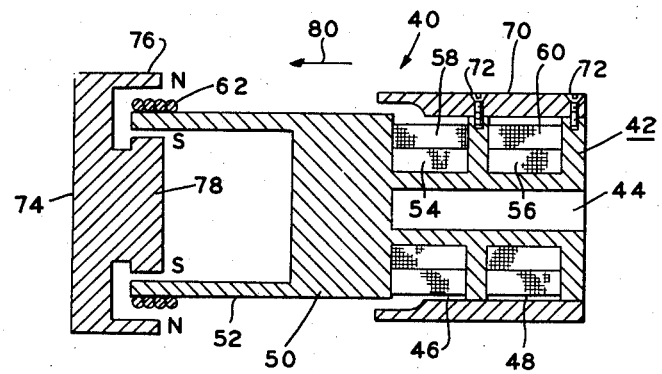
FIGURE 4 is a transverse sectional view of a stress balance accelerometer of the present invention.

Referring to FIGURE 4, a modification of the accelerometer of the present invention is generally designated as 40. Accelerometer 40 is a stress balance accelerometer.

Accelerometer 40 comprises a core 42 which is circular in transverse cross-section. Core 42 is of a magnetic material the permeability of which varies when the material is stressed, such as permalloy. The core 42 is provided with a blind passage 44 extending longitudinally from the center of one end thereof. A pair of longitudinally spaced, annular grooves 46 and 48 are provided in the outer surface of the core 42 around the passage 44. The core 42 has a solid portion 50 adjacent the groove 46 which acts as a weight. A hollow, tubular portion 52 is integral with the weight 50 and projects longitudinally therefrom away from the grooves 46 and 48.

Separate primary windings 54 and 56 of insulated, electrically conductive wires are wound around the core 42 within the grooves 46 and 48 respectively. The primary windings 54 and 56 are of the same length. Separate secondary windings 58 and 60 of insulated, electrically conductive wires are wound around the core 42 within the grooves 46 and 48 respectively. The secondary windings 58 and 60 are of the same length. An inductance winding 62 of an insulated, electrically conductive wire is wound around the free end of the tubular portion 52 of the core 42.

Figure 5:
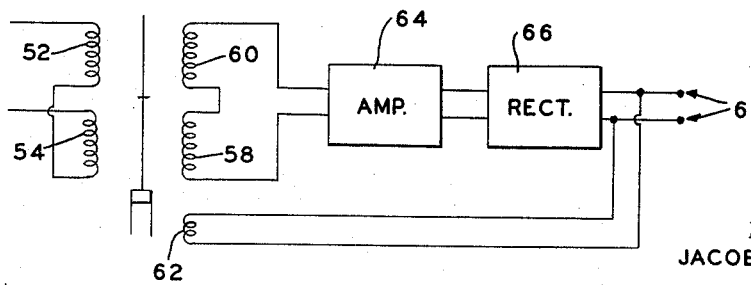
FIGURE 5 is a schematic view of the electrical circuit of the accelerometer of FIGURE 4.

As shown in FIGURE 5, the primary windings 54 and 56 are electrically connected together, and the secondary windings 58 and 60 are electrically connected together. The primary windings 54 and 56 and the secondary windings 58 and 60 are connected together in the same manner as the primary and secondary windings of the accelerometer 10 of FIGURE 1 previously described so that when an A.C. current is placed across the primary windings 54 and 56, the voltages induced across the secondary windings 58 and 60 are of opposite polarity. The output from the secondary windings 58 and 60 of the accelerometer 40 is connected to an amplifier 64 to amplify the A.C. output from the secondary windings. The output of the amplifier 64 is connected to a rectifier 66 to convert the A.C. signal to a D.C. signal. The output side of the rectifier 66 is connected to output terminals 68. The inductance winding 62 is connected across the output side of the rectifier 66 so that a portion of the D.C. signal from the rectifier is fed across the inductance coil 62.

Referring again to FIGURE 4, a mounting sleeve 70 of a magnetic material extends around the portion of the core 42 containing the annular grooves 46 and 48. Mounting sleeve 70 is secured to the core 42 only on the side of the annular groove 46 away from the weight 50, such as by screws 72. The end of the mounting sleeve 70 which is adjacent the weight 50 is free from the core 42.

A magnet 74 is mounted adjacent the free end of the tubular portion 52 of the core 42. Magnet 74 has a cylindrical pole 76 extending around and overlapping the free end of the tubular portion 52 and the inductance winding 62. The other pole 78 of the magnet 74 extends within and overlaps the tubular portion 52 and the inductance winding 62. Although the outer pole 76 of the magnet 74 is shown as being the north pole, and the inner pole being the south pole, the poles of the magnet may be reversed. Also, the magnet 74 may be either a permanent magnet or an electromagnet.

In the use of the accelerometer 40, the accelerometer is supported on the body to be moved by the sleeve 70, and an A.C. current is placed across the primary windings 54 and 56. When the body is stationary, the voltages induced across the secondary windings 58 and 60 are of equal magnitude, and thereby balance each other out so as to provide a zero output from the accelerometer. When the accelerometer 40 is accelerated longitudinally, for example in the direction of the arrow 80, the weight 50 will apply a force to the portion of the core 42 within the groove 46, but will not apply a force to the portion of the core 42 within the groove 48. The force applied to the portion of the core 42 within the groove 46 stresses that portion of the core, and thereby varies the permeability of the material of that portion of the core. This in turn varies the voltage induced across the secondary winding 58. However, since no force is applied to the portion of the core 42 within the groove 48, that portion of the core is not stressed so that the voltage induced across the secondary winding 60 is not changed. Therefore, the voltage induced across the secondary winding 58 is of a magnitude different from the voltage induced across the secondary winding 60 so as to provide an output signal from the secondary windings. The A.C. output signal from the secondary windings 58 and 60 is amplified by the amplifier 64, and converted to a D.C. signal by the rectifier 66. The D.C. signal from the rectifier 66 can be read across the output terminals 68. Also, the D.C. signal from the rectifier 66 is placed across the inductance winding 62 so as to create a flux path around the inductance winding 62. The inductance winding 62 is wound in a manner so that the flux path created thereby is in a direction opposite to the flux path provided by the magnet 74. The opposing flux paths provided by the inductance winding 62 and the magnet 74 apply a force to the tubular portion 52 of the core 42 in the direction opposite to that indicated by the arrow 80 in FIGURE 4. This force tends to relieve the stresses in the portion of the core 42 within the groove 46 so as to reduce the magnitude of the voltage induced across the secondary winding 58. However, the stresses in the portion of the core 42 within the groove 46 caused by the acceleration of the accelerometer 40 are not completely relieved so that a small electrical output is still provided from the secondary windings 58 and 60 which can be read across the output terminals 68. Thus, upon accelerating the accelerometer 40, there is provided a small output signal from the accelerometer which provides an accurate measurement of the acceleration.

The present invention may be embodied in other specific forms without departing from the spirit or essential attributes thereof and, accordingly, reference should be made to the appended claims, rather than to the foregoing specification as indicating the scope of the invention.

I claim:

1. An accelerometer comprising a core of a magnetic material the permeability of which varies when the material is stressed, a longitudinal passage in said core, a pair of longitudinally spaced annular grooves in the outer surface of said core, said grooves being around said passage, a separate primary winding wound around said core in each of said grooves, a separate secondary winding wound around said core in each of said grooves, said primary windings being electrically connected together, said secondary windings being electrically connected together, the connection between said primary windings and between said secondary windings being such that when a current is applied to said primary windings the voltages induced across the secondary windings are of opposite polarity, a weight secured to said core at one end of the passage, and mounting means secured to said core between the grooves, said mounting means being free from the end of the core to which the weight is secured so that said weight is adapted to stress only the portion of the core under one of said grooves when the accelerometer is accelerated.

2. An accelerometer in accordance with claim 1 in which the mounting means comprises a mounting sleeve of a magnetic material surrounding the core, said sleeve being secured to the core between the grooves and the end of said sleeve adjacent the weight being free of the core.

3. An accelerometer comprising a core of a magnetic material the permeability of which varies when the material is stressed, a passage extending longitudinally through said core from end to end, a pair of longitudinally spaced annular grooves in the outer surface of said core, a separate primary winding wound around said core in each of said grooves, a separate secondary winding wound around said core in each of said grooves, said primary windings being electrically connected together, said secondary windings being electrically connected together, the connection between said primary windings and between said secondary windings being such that when a current is applied to said primary windings the voltages induced across the secondary windings are of opposite polarity, a separate weight secured to said core within the passage at each end of the passage, and a mounting sleeve of a magnetic material around the core, said sleeve being secured to said core only between the grooves with the end portions of the sleeve being free from the core, each of said weights being adapted to stress only the portion of the core under its adjacent groove when the accelerometer is accelerated.

4. An accelerometer comprising a core of a magnetic material the permeability of which varies when the material is stressed, a longitudinal passage in said core, a pair of longitudinally spaced annular grooves in the outer surface of said core, said grooves being around said passage, a separate primary winding wound around said core in each of said grooves, a separate secondary winding wound around said core in each of said grooves, said primary windings being electrically connected together, said secondary windings being electrically connected together, the connection between said primary windings and between said secondary windings being such that when a current is applied to said primary windings the voltages induced across the secondary windings are of opposite polarity, a weight secured to said core at one end of the passage, a mounting sleeve of a magnetic material surrounding the core, said sleeve being secured to the core only on the side of the groove adjacent the weight away from the weight with the end of the sleeve adjacent the weight being free from the core so that said weight is adapted to stress only the portion of the core under one of said grooves when the accelerometer is accelerated, a tubular projection secured to and extending longitudinally from said weight away from the grooves in the core, an inductance winding wound around the free end of the tubular projection, and a magnet mounted adjacent the free end of the tubular projection, one pole of said magnet surrounding the free end of the tubular projection and the other pole of the magnet being within the free end of the tubular projection.

References Cited in the file of this patent

UNITED STATES PATENTS

| | | |
|---|---|---|
| 1,906,551 | Forest | May 2, 1933 |
| 2,338,732 | Nosker | Jan. 11, 1944 |
| 2,728,868 | Peterson | Dec. 27, 1955 |
| 2,780,101 | Kinkel | Feb. 5, 1957 |